United States Patent [19]

Lorenz et al.

[11] 4,047,470

[45] Sept. 13, 1977

[54] MACHINE FOR WORKING METAL SURFACE

[75] Inventors: Horst Lorenz, Solingen; Rolf Eckart Koch, Witzhelden; Reiner Kahlhofer, Wuppertal-Barmen, all of Germany

[73] Assignee: Th. Kieserling & Albrecht, Solingen, Germany

[21] Appl. No.: 620,776

[22] Filed: Oct. 8, 1975

[30] Foreign Application Priority Data

Oct. 10, 1974 Germany .............................. 2448360

[51] Int. Cl.² .............................................. B23C 3/13
[52] U.S. Cl. .................................. 90/15 R; 90/11 R; 51/87 R
[58] Field of Search ............ 90/11 R, 15, 21 R, 21 A, 90/21 B, 2.1 C; 51/87 R

[56] References Cited

U.S. PATENT DOCUMENTS

| 3,534,656 | 10/1970 | Michelson | 90/11 R |
| 3,545,336 | 12/1970 | Savko | 90/15 R |
| 3,845,533 | 11/1974 | Tinfow et al. | 51/87 R |

Primary Examiner—Gil Weidenfeld
Attorney, Agent, or Firm—Edward E. Sachs

[57] ABSTRACT

Apparatus for machining the surface of an elongated rigid workpiece passing therethrough in a predetermined direction along a path. The apparatus includes at least one station having opposed tools for engaging opposite sides of the workpiece. The tools have tool axes extending generally perpendicular to the path. The tools are mounted for movement of their axes toward and away from the path, and for tilting movement of their axes relative to the path in a plane extending generally perpendicular to the path.

18 Claims, 4 Drawing Figures

MACHINE FOR WORKING METAL SURFACE

The invention relates generally to apparatus for machining the surface of elongated rigid workpieces and, more particularly, to apparatus for machining the surface of elongated rigid workpieces having an irregular surface, and a non-uniform cross-sectional size and shape along the length thereof. The apparatus includes at least one station having opposed tools for engaging opposite sides of the workpiece to perform work thereon.

One common type of machine tool includes a movable tool which travels over a stationary workpiece on a track secured to the bed of the machine. Other known machines include peeling machines for wire and rod or pipe wherein the workpiece passes through the machine in a predetermined direction. Prior machines of the type described are not suitable for removing friable surface layers or scale known as skin from the workpieces in the form of rolled billets or slabs. Elongated rigid workpieces of this type are usually bent longitudinally, have irregular rough outer surfaces, and have cross-sectional shapes and sizes which vary somewhat along their length. It is not economical to straighten such workpieces before removing the skin.

It is also known to remove the skin from elongated rigid workpieces of the type described by sandblasting or shotblasting. This is an expensive process because it is very difficult to recover the sand or shot from the removed particles of skin. In addition, a layer of decarburized surface material under the skin is not removed by sandblasting or shotblasting.

Skin has also been removed from elongated rigid workpieces by rotating wire brushes. However, the use of this procedure on elongated rolled workpieces in the form of slabs, plates or billets is not suitable because such workpieces cannot be fed to automated machines of conventional design.

The skin is also removed from workpieces of the type described by use of a grindstone in a semi-automatic grinder which is moved over the workpiece by an operator. Machines of this type include a counter-weight and a system of levers by which the operator applies the grindstone to the workpiece. In spite of the counter-weight and lever system, heavy labor is involved and any increase in output can be achieved only by increasing the physical demands made upon the operator.

In view of the foregoing, it is the primary object of the present invention to provide a machine which can remove a uniform layer of skin from elongated rigid workpieces which are longitudinally curved, have irregular rough surfaces, and have a non-uniform cross-sectional size and shape along their length.

It is a further object of the present invention to provide a machine of the type described which is relatively simple in operation, and economical to manufacture and assemble.

It is an additional object of the invention to provide a machine of the described wherein opposed tools are cross-connected so that movement of one tool in one direction relative to the workpiece automatically causes an opposite movement of the opposed tool in an opposite direction relative to the workpiece.

It is another object of the invention to provide a machine of the type described with means whereby the tools operating on the surface of elongated rigid workpieces will automatically follow curves, irregularities, twists, and slight differences in cross-sectional size and shape for removing a substantially uniform layer of skin from the workpiece.

An aspect of the present invention resides in an apparatus having at least one station through which elongated rigid workpieces travel in a predetermined direction along a path. The station includes opposed tools which work on opposite sides of the workpiece. The tools have tool axes extending generally perpendicular to the path along which the workpieces travel, and the tools are mounted for movement of their axes toward and away from the path. The tools are also mounted for tilting movement of their axes relative to the path in a plane extending generally perpendicular to the path.

With an arrangement of the type described, the tools automatically follow curvatures and irregularities in the workpieces which thereby serve as guides for the tools. The tools are applied against opposite sides of the workpieces with substantially equal force so that the tools exert substantially no bending moment on the workpieces. Each set of opposed tools at a station are supported generally floatingly in a plane extending generally perpendicular to the feed path of the workpieces and there is no bending of the workpiece by the tools. Pivotal mounting of the tools for tilting movement of their axes allows the tools to follow virtually any distortion in the workpieces, and any lack of parallelism between opposite sides of the workpieces, without having the tools become separated from the workpiece surface. This desirable arrangement is preferably applied to all stations in the apparatus, whether the stations be workpiece feeding stations or machining stations. Various types of opposed tools may be combined at a single station, and the tools at each station are counterbalanced so that the opposed tools are applied to the opposite sides of the workpiece with substantially equal force, and no bending forces are applied to the workpieces by the tools.

Although tools of any suitable type may be used in the apparatus of the present invention for operating on the workpieces to remove the skin therefrom, one particularly advantageous known type of tool is disclosed in German patent publication No. 1,802,360. A tool of this type is somewhat like a cylindrical rotary wire brush, and is known as a needle milling cutter. Cutters of this type are particularly suitable for apparatus of the present invention because the cutters will produce substantially uniform skin removal on both sides of the workpiece even though the workpiece has relatively minor surface irregularities and is longitudinally curved. At the workpiece feed stations, the tools may simply be feed rollers.

In a preferred arrangement, the apparatus has a plurality of stations through which the workpieces travel, and the stations are arranged consecutively in the predetermined direction in which the workpieces travel. The plurality of stations include two opposite end stations which define feed stations for feeding elongated workpieces to and from the apparatus, and at least one intermediate station having tools which perform work on the workpieces. The intermediate station or stations preferably comprise a machining station having tools in the form of needle milling cutters for removing skin from the workpieces. The outlet or discharge feed station also serves to raise the workpieces up onto a following or discharge roller table. The means for raising the workpieces onto the discharge roller table operates momentarily for so raising the workpiece and is then inoperative until a new workpiece begins traveling through the apparatus. The infeed and discharge roller tables located on opposite sides of the apparatus are used to support the workpiece as it travels through the apparatus.

In the preferred embodiment of the invention, each opposed pair of tools at a station are movably attached to straight guides extending generally perpendicular to the path along which the workpieces travel. This allows movement of the tools and the tool axes toward and away from the path. Each tool is also mounted for tilting movement of each tool axis relative to the path in a plane extending generally perpendicular to such path. In other words, each tool is mounted for pivotal movement on a pivot axis which extends generally parallel to the direction of workpiece movement, and perpendicular to the tool axes.

In order to minimize excessive inertia forces which may impair the mobility of the tools at each station, each individual tool may be associated with a fluid operating cylinder, with one end of each cylinder being hingedly connected to a movable tool, and the other end thereof hingedly connected to the frame of the apparatus. The cylinders for each opposed pair of tools at a station have pressure chambers which are connected together by a compensating fluid conduit, and also have unpressurized chambers connected together by a compensating fluid conduit. Weight counterbalancing cylinders are also provided for at least certain tools so that the tools are moved into engagement with a workpiece by the operating cylinders with substantially equal force. These arrangements insure that each pair of opposed tools at a station generally float in a plane extending generally perpendicular to the path of workpiece travel independently of the pressure in the pressure chambers of the operating cylinders. This arrangement also reduces the number of pressure limiting valves required in the hydraulic circuit. In addition, it is possible to use a relatively small high pressure pump to produce the pressure required for applying the tools to the workpiece. The volumes of hydraulic fluid flowing through the single pressure limiting valve in the hydraulic circuit are relatively small because the volume of fluid displaced from one cylinder is absorbed by the opposite cylinder or the chambers associated therewith. In other words, cross-connection of the cylinders allows automatic movement of one tool in one direction relative to the workpiece feed path upon movement of an opposing tool in an opposite direction to follow a curvature or irregularity in the workpiece surface.

In accordance with a preferred arrangement, all tools at each station are preferably provided with hydraulic weight compensation cylinders. Where the tools are arranged vertically so that there are upper tools and lower tools, hydraulic weight compensation is provided only for the upper tools so that hydraulic pressure supplied to the operating cylinders will apply the tools to the workpiece with substantially equal force. Hydraulic weight compensation substantially prevents the tools from applying any bending moment to the workpiece, and also makes it possible for the tools to work at an operating pressure which is less than the weight of the tools. Where the tools are vertically positioned on opposite sides of the workpiece and the weight compensating cylinders are provided only for the upper tools, the weight compensating cylinder does not have to be separately controlled, and control devices and change-over values are not required for the weight compensating cylinders.

In a preferred arrangement, the tools used in the apparatus of the present invention are preferably generally cylindrical and rotate on tool axes extending generally perpendicular to the path of workpiece travel in a predetermined direction. Obviously, it is possible to combine many different types of opposed tools at any given station. In one arrangement, a rotatably driven working tool and a freely rotating opposed pressure roller may be combined at any given station. In the alternative, both tools at each station may be rotatably driven. The advantages of combining a working tool with a freely rotating opposed roller include that of making it possible to remove different amounts or thicknesses of skin from one side of the workpiece. In addition, where the driving momentum for the workpieces can be produced in a feed station with only one feed tool instead of two, the drive means for the rotatable pressure rollers can be eliminated. In other words, any or each of the stations can have both opposed tools rotatably driven, or only one tool rotatably driven, while the opposed tool is freely rotating.

For a better understanding of the present invention, together with other and further objects thereof, reference is had to the following description taken in connection with the accompanying drawings, and its scope will be pointed out in the appended claims.

Figure 3:
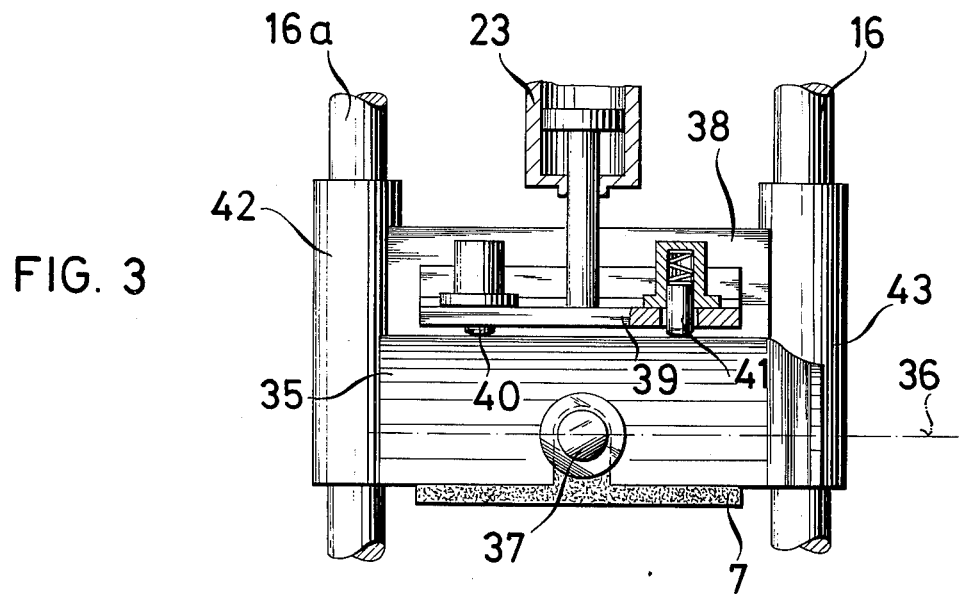
Figure 4:
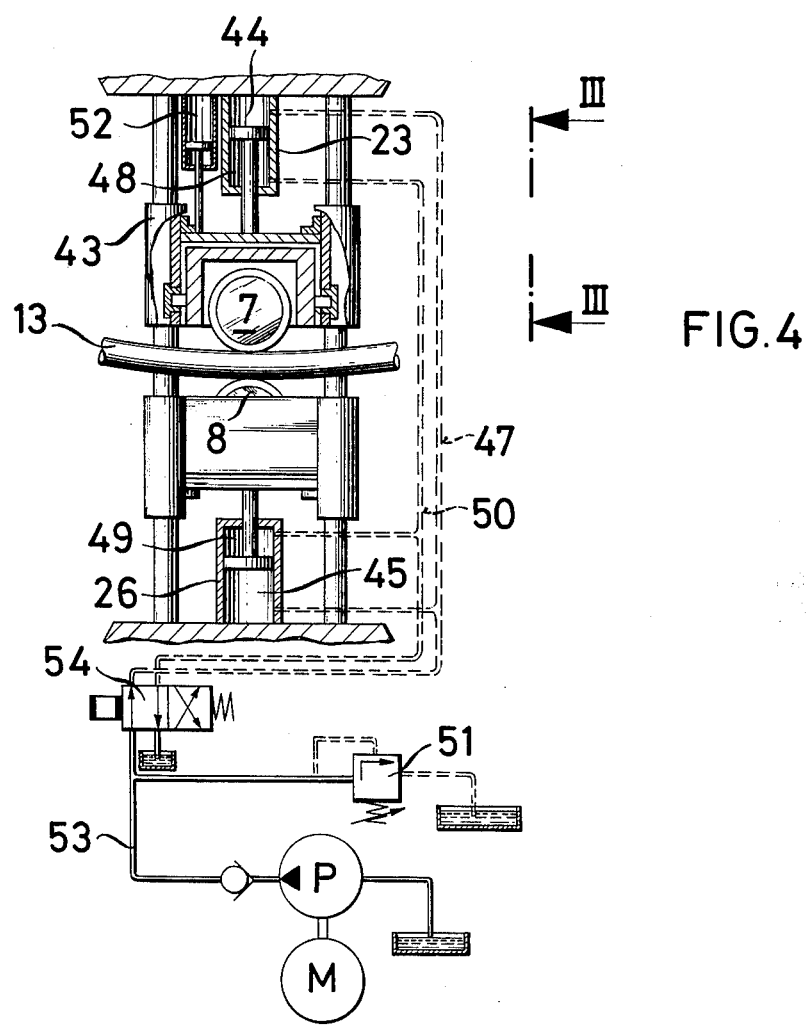

FIG. 3 is a side elevational view of another arrangement for suspending opposed tools in the apparatus of the present invention, and with portions omitted for clarity of illustration, and taken generally on line III—III of FIG. 4; and FIG. 4 is a partial cross-sectional elevational view showing a machining station with a somewhat schematic hydraulic circuit connected to cylinders which control movement of the tools.

Figure 1:
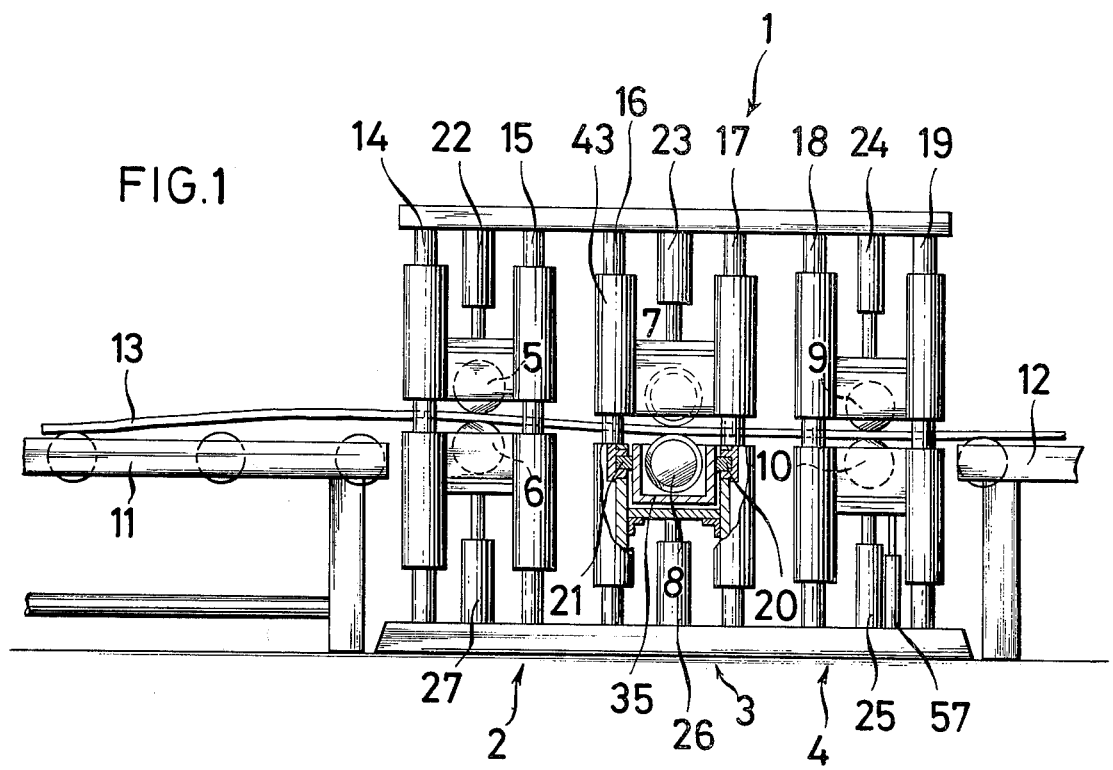
FIG. 1 is a somewhat schematic side elevational view of an apparatus constructed in accordance with the present invention.

Referring now to the drawing, and particularly to FIG. 1, there is shown an apparatus or machine 1 which includes workpiece processing stations 2, 3 and 4, with stations 2 and 4 being workpiece feed stations, while intermediate station 3 is a machining station for machining a layer of skin from the workpiece surface.

Each of the stations 2, 3 and 4 has at least two opposed tools 5 and 6, 7 and 8, and 9 and 10, engageable with opposite sides of a workpiece. Opposed tools 5 and 6, and 9 and 10, are workpiece feed rollers of generally cylindrical shape, while tools 7 and 8 are generally cylindrical needle milling cutters.

Infeed and discharge roller tables 11 and 12 are arranged on opposite sides of apparatus 1 as shown in FIG. 1. An elongated rigid workpiece 13 lies only on roller tables 11 and 12 as it is fed through the apparatus stations 2, 3 and 4 in a predetermined direction along a path. Elongated rigid workpiece 13 is an elongated rolled slab, plate or billet having an irregular rough surface, and a non-uniform cross-sectional size and shape along its length. The workpiece 13 is also usually longitudinally curved and twisted. Due to the curvature and irregularities in workpiece 13, it does not travel through apparatus 1 from infeed roller table 11 to discharge roller table 12 along a perfectly straight longitudinal path. However, such workpiece travels along a generally predetermined path in a predetermined direction from infeed roller table 11 to discharge roller table 12 as is apparent from the drawing and description.

Each station 2, 3 and 4 includes a pair of elongated vertical guide rods 14 and 15, 16 and 17, and 18 and 19, which extend generally perpendicular to the path of workpiece travel. Each opposed pair of tools at a station are mounted on sleeves slidably received on the guide rods for movement of the tools toward and away from the path of workpiece travel.

Each tool 5-10 is preferably cylindrical and rotates on a tool axis extending generally perpendicular to the path of workpiece travel. The tool axes also extend generally perpendicular to a vertical plane extending through each pair of guide rods. In addition to movement of each tool toward and away from the path of workpiece travel, each tool is mounted for tilting movement of its longitudinal axis in a plane extending generally perpendicular to the path of workpiece travel. It will be recognized that all of the tools are mounted for tilting movement of their axes, although a specific example will be given only for tool 8.

As shown in FIG. 1, tool 8 is adapted to pivot about trunnions 20 and 21 about a pivot axis extending generally parallel to the path of workpiece travel and generally perpendicular to the axis of the tool 8. The tool 8 is rotatably supported in a holder 35 and the holder 35 is pivotally supported by the trunnions 20 and 21 in the immediate vicinity of the surface of the workpiece 13 to be worked upon or machined.

Each tool is moved into engagement with the workpiece 13, and toward the path of workpiece travel, by individual operating fluid cylinders 22, 23, 24, 25, 26 and 27. Final or outfeed station 4 before discharge roller table 12 has an additional hydraulic cylinder 57 operated intermittently or momentarily by suitable control means for raising the tools at the discharge station 4, along with the discharge end of the workpiece 13, for depositing the discharge end of the workpiece 13 on the discharge table 12. The additional hydraulic cylinder is de-energized immediately after it has been operated to raise the discharge end of a workpiece to the level of the discharge table 12.

FIG. 4 shows one arrangement for providing mobility to opposed tools at any given station to engage opposite sides of the workpiece 13. As previously explained, the curvature, twist and irregular nature of the workpiece 13 causes the tools to move back and forth relative to the path of workpiece travel. Movement of the tools is accomplished by having pressure chambers 44 and 45 of opposed operating cylinders 23 and 26 connected together by compensating fluid conduit 47. In a similar manner, unpressurized chambers 48 and 49 of operating cylinders 23 and 26 are connected together by means of a compensating fluid conduit 50. When the curvature of the workpiece 13 causes both tools in one opposed pair to move in the same direction, no hydraulic fluid escapes through pressure limiting valve 51 back to the reservoir. The pressure limiting valve 51 also enables the opposed tools 7 and 8 to yield when there is any change in the thickness of the workpiece 13. Cross-connection of the opposed cylinders provides movement of one tool in one direction relative to the path of workpiece travel when the opposite tool moves in an opposite direction due to the curvature or irregularity of the workpiece 13. When the opposed tools move toward one another, fluid can escape through the pressure limiting valve 51 so that the force with which each tool engages the workpiece 13 remains substantially constant.

In a preferred arrangement, a weight compensating cylinder 52 is hingedly connected to the holder for the upper tool 7 and to the frame of the apparatus 1. This compensating cylinder 52 compensates for the weight of the two hydraulically interconnected tools 7 and 8, along with their holders so that pressurization of the pressure chambers 44 and 45 will apply the tools 7 and 8 against the opposite sides of the workpiece 13 with substantially equal force. A constant pressure is maintained in the weight compensating cylinder 52, and this constant pressure is relieved only when the apparatus 1 is finally turned off. In the arrangement shown and described, wherein the tools are arranged vertically above one another on opposite sides of the workpiece 13, a weight compensating cylinder is provided only for the upper tool 7 and its carrier for counterbalancing the weight of such tool and its holder in order to provide substantially equal force application of the tools to the opposite sides of the workpiece 13 when hydraulic fluid is supplied to the pressure chambers 44 and 45 of the hydraulic operating cylinders 23 and 26.

FIG. 3 is a somewhat enlarged view showing a suspension arrangement for a tool 7 which is mounted in the holder 35 for rotation about a tool axis 36. Obviously, the tool 7 is rotatably driven by a cardan shaft and motor which is not shown. The tool holder 35 is mounted for pivotal movement about trunnion 37 which is comparable to the trunnion 21 of FIG. 1. The rear trunnion of the tool holder 35 is comparable to the trunnion 20 of FIG. 1, and is mounted in plate 38 of FIG. 3. The plate 38 and its opposite counterpart, which is not shown for clarity of illustration in FIG. 3 and is normally associated with the trunnion 37, are joined together by a web 39. The hydraulic operating cylinder 23 which moves the tool 7 against the workpiece 13 and toward the path of workpiece travel, engages with the web 39. The web 39 has two spring-biased pins 40 and 41 which bear against the holder 35 for returning the holder 35 to its normal position shown in FIG. 4 when such return is necessary. The guide sleeves 42 and 43 slide along the guide rods 16 and 16a for moving the plate 38 in a direction generally perpendicular to the path of workpiece travel.

It will be recognized that the described arrangement for mounting the tools defines a mounting means which provides automatic movement of the tool axes toward and away from the path of workpiece travel and automatic tilting movement of the tool axes relative to the path of workpiece travel. Tilting movement of the tool axes takes place generally in a plane extending generally perpendicular to the path of workpiece travel. The mounting means includes the cylinders 22-27 which define yieldable biasing means for yieldably biasing the tools toward the path of workpiece travel.

Figure 2:
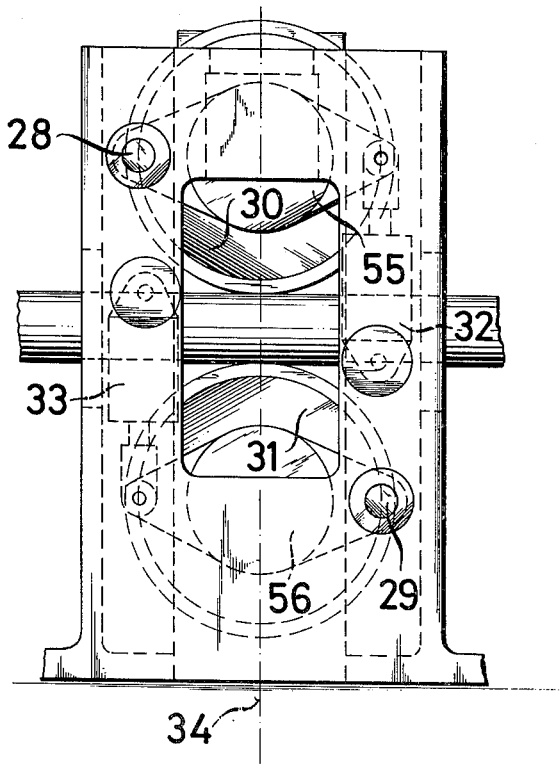
FIG. 2 is a side elevational view showing a suspension arrangement for an opposed pair of tools at one station.

In the embodiment of the invention illustrated in FIG. 2, generally cylindrical tools or rollers 30 and 31 are mounted on levers 55 and 56 which in turn are pivotally mounted on pivot axes 28 and 29 in the frame of the apparatus 1. The pivot axes for the levers are at one end thereof, while the other ends of such levers engage with the operating or working cylinders hingedly connected to the frame of the machine. The tools 30 and 31 are mounted on the levers between the two hinge points of the pivot axes 28 and 29, and the pivot connections of the cylinders 32 and 33 therewith. Each tool 30 and 31 have such a lever 55 or 56 at its opposite ends, and a hydraulic cylinder 32 or 33 is associated with such levers. The levers 55 and 56 are pivotable independently of one another, and the tools 30 and 31 are mounted in the levers 55 and 56 in self-aligning bearings for free adaptation to twists, curves or irregularities in the workpiece 13 traveling between the tools. The hinge points or pivot axes for the levers in the frame of the apparatus are arranged on opposite sides of a center plane 34 at each station from the pivot axes for the working cylinders connected to the levers. As shown in FIG. 2, the symmetrical arrangement of the pivot points for the tools, levers and operating cylinders provides a particularly compact design for each processing or working station of the apparatus 1.

The arrangement of FIG. 2 simply represents an alternative mounting for each tool 5-10 of FIG. 1. Using tool 7 of FIG. 3 as an example, it will be recognized that pivoted levers 55 and 56 of FIG. 2 replace guides 16 and 16a, and sleeves 42 and 43, of FIG. 3. Also, tools 30 and 31, which correspond to any of tools 5 and 6, or 7 and 8, or 9 and 10, are described as mounted to levers 55 and 56 by self-aligning bearings and such bearings replace trunnion 37 of FIG. 3.

In the arrangement of the present invention, opposed generally cylindrical tools at a work station are mounted for movement of their rotational axes toward and away from the path of workpiece travel. The tools are also mounted for tilting movement of their axes relative to the path in a plane extending generally perpendicular to the path so that the tools can automatically follow curvatures, irregularities and twists in the workpiece. The opposed tools at each station are cross-connected so that movement of one tool in one direction relative to the path of workpiece travel due to a curvature or irregularity in the workpiece will automatically cause movement of the opposed tool in an opposite direction relative to the path. The pressure biasing means of the fluid cylinders, along with the weight compensating cylinders, provide application of the tools to the opposite sides of the workpiece with substantially equal force. This insures substantially equal and uniform removal of the skin from both sides of the workpiece. The longitudinal axes of each opposed pair of tools at a station are normally urged into a generally parallel relationship by the biasing means defined by the spring-biased pins 40 and 41 of FIG. 3. These yieldably biased pins allow each generally cylindrical tool to tilt for movement of its rotational axis in a plane extending generally perpendicular to the path of workpiece travel so that the tools can follow twists and irregularities in the workpiece, while being biased back for following opposite curvatures and irregularities.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for working on the surface of an elongated generally flat rigid workpiece passing therethrough in a predetermined direction along a path comprising; at least one station having opposed generally cylindrical tools for engaging opposite generally flat irregular sides of a workpiece, said tools having tool axes extending generally perpendicular to said path, mounting means mounting said tools for automatic movement of said axes thereof toward and away from said path and for automatic tilting movement of said axes relative to said path with said tilting movement being generally in a plane extending generally perpendicular to said path, and said mounting means including yieldable biasing means yieldably biasing said tools toward said path, whereby said tools automatically follow the sides of the workpiece even though such sides are irregular due to curves, twists, and dimensional and shape variations in the workpiece.

2. The apparatus of claim 1 including a plurality of stations, each said station having said opposed tools thereat, said stations including opposite end feed stations and at least one intermediate machining station for machining the surface of a workpiece.

3. The apparatus of claim 1 wherein at least one of said tools comprises a needle milling cutter.

4. The apparatus of claim 1 wherein said mounting means includes guides extending generally perpendicular to said path, said tools being mounted on said guides for movement of said tool axes toward and away from said path, and said mounting means including pivot connections connecting each said tool for pivotal movement about pivot axes extending generally parallel to said predetermined direction and generally perpendicular to said tool axes for tilting movement of said tool axes relative to said path.

5. The apparatus of claim 4 wherein said yieldable biasing means includes fluid cylinders operatively associated with each said tool, said cylinders having pressure chambers for moving said tools toward said path and unpressurized chambers, said cylinders associated with said opposed tools having said pressure chambers thereof connected together and said unpressurized chambers thereof connected together by compensating fluid conduits.

6. The apparatus of claim 5 wherein said mounting means includes weight compensating cylinder means associated with at least one of said tools for compensating for the weight of said one tool.

7. The apparatus of claim 1 wherein at least one of said tools comprises a rotatably driven machining tool.

8. The apparatus of claim 7 wherein the other of said tools comprises a freely rotatable pressure roller.

9. The apparatus of claim 1 wherein said tools comprise rotatably driven machining tools.

10. The apparatus of claim 1 wherein said yieldable biasing means includes fluid cylinders having pressure chambers for moving said tools toward said path, said cylinders having unpressurized chambers, and said cylinders having said pressurized chambers thereof connected together and said unpressurized chambers thereof connected together by compensating fluid conduits.

11. The apparatus of claim 1 wherein said mounting means includes weight compensating cylinder means associated with at least one of said tools for compensating for the weight of said one tool.

12. The apparatus of claim 1 wherein said mounting means includes pivoted levers on which said tools are mounted for movement of said tool axes toward and away from said path by pivotal movement of said levers.

13. Apparatus for machining the surface of elongated longitudinally curved rigid workpieces having opposite generally flat irregular surfaces and nonuniform cross-sectional sizes and shapes along their length comprising; a plurality of spaced-apart stations through which the workpieces travel generally longitudinally in a predetermined direction along a path, said stations including opposite end feed stations and at least one intermediate machining station, each said station including opposed generally cylindrical tools for engaging the opposite sides of the workpieces, said tools being rotatable and having tool axes extending generally perpendicular to said path, at least one said tool at each said station being rotatably driven, mounting means mounting said tools for automatic movement of said tool axes toward and away from said path and for tilting movement of said axes relative to said path with said tilting movement being generally in a plane extending generally perpendicular to said path so that said tools automatically move to follow curvatures and irregularities in the workpieces, and yieldable biasing means yieldably biasing said tools toward said path.

14. The apparatus of claim 13 wherein said opposed tools at each said station are cross-connected to move in unison in the same direction.

15. The apparatus of claim 13 wherein said opposed tools at each said station include an upper tool and a lower tool, and said mounting means includes weight compensating cylinder means connected at least with said upper tool at said machining station for compensating for the weight thereof so that both of said opposed tools engage the workpiece with generally equal force.

16. The apparatus of claim 15 wherein said mounting means includes hydraulic operating cylinders connected with said tools for moving said tools toward said path with substantially equal force, said cylinders having pressure chambers, and said pressure chambers for said operating cylinders for said opposed tools at each said station being connected by compensating fluid conduit means.

17. The apparatus of claim 13 wherein said driven tool at said intermediate station comprises a needle milling cutter.

18. The apparatus of claim 13 wherein said mounting means includes yieldable tilting means for normally biasing said opposed tools to position said tool axes generally parallel to one another, and said yieldable tilting means being yieldable for providing tilting movement of said tool axes so that said tools follow curvatures, twists and irregularities in the surface of the workpiece.

* * * * *